(12) United States Patent
Ishii

(10) Patent No.: US 8,656,470 B2
(45) Date of Patent: Feb. 18, 2014

(54) IMAGE PROCESSING APPARATUS, ACCESS CONTROL METHOD, AND STORAGE MEDIUM

(75) Inventor: Yuichi Ishii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/353,384

(22) Filed: Jan. 19, 2012

(65) Prior Publication Data

US 2012/0192257 A1    Jul. 26, 2012

(30) Foreign Application Priority Data

Jan. 26, 2011    (JP) .................................. 2011-013737

(51) Int. Cl.
*G06F 7/00*    (2006.01)

(52) U.S. Cl.
USPC .................................. 726/7; 705/30; 358/1.15

(58) Field of Classification Search
USPC .................................. 726/7; 705/30; 358/1.15
See application file for complete search history.

(56) References Cited

U.S. PATENT DOCUMENTS

| | | | |
|---|---|---|---|
| 8,310,697 B2 * | 11/2012 | Kitamura et al. | 358/1.15 |
| 2007/0013942 A1 * | 1/2007 | Ozawa et al. | 358/1.15 |
| 2007/0053529 A1 * | 3/2007 | Suyama et al. | 381/119 |
| 2008/0204796 A1 * | 8/2008 | Kitamura et al. | 358/1.15 |
| 2008/0220875 A1 * | 9/2008 | Sohl et al. | 463/42 |
| 2009/0180141 A1 | 7/2009 | Takaishi et al. | |
| 2010/0064256 A1 | 3/2010 | Esaki | |
| 2011/0218892 A1 * | 9/2011 | Jeong et al. | 705/30 |

FOREIGN PATENT DOCUMENTS

| | | |
|---|---|---|
| JP | 2004-289302 | 10/2004 |
| JP | 2006-235757 | 9/2006 |
| JP | 2007-156698 | 6/2007 |
| JP | 2008-176704 | 7/2008 |
| JP | 2009-170997 | 7/2009 |
| JP | 2010-068542 | 3/2010 |

OTHER PUBLICATIONS

Extended European search report dated Aug. 22, 2013.

* cited by examiner

*Primary Examiner* — Beemnet Dada
*Assistant Examiner* — Sayed Beheshti Shirazi
(74) *Attorney, Agent, or Firm* — IPUSA, PLLC

(57) ABSTRACT

An image processing apparatus includes a request determining unit receiving an operation event indicating a request to use an image processing function and determining whether the request is from a guest user based on the received operation event; a guest login processing unit generating guest login information including a guest user identifier and access right information of the guest user if the request is from the guest user and sending a login request to request a login process for the guest user based on the guest login information; an access control unit disabling access control on the image processing function in response to the login request based on the access right information in the guest login information; and a usage history recording unit recording a usage history of the image processing function in association with the guest user based on the guest user identifier in the guest login information.

13 Claims, 10 Drawing Sheets

FIG.6

| USER IDENTIFIER | ACCESS RIGHT |
|---|---|
| GUEST001 | COPY |

115D

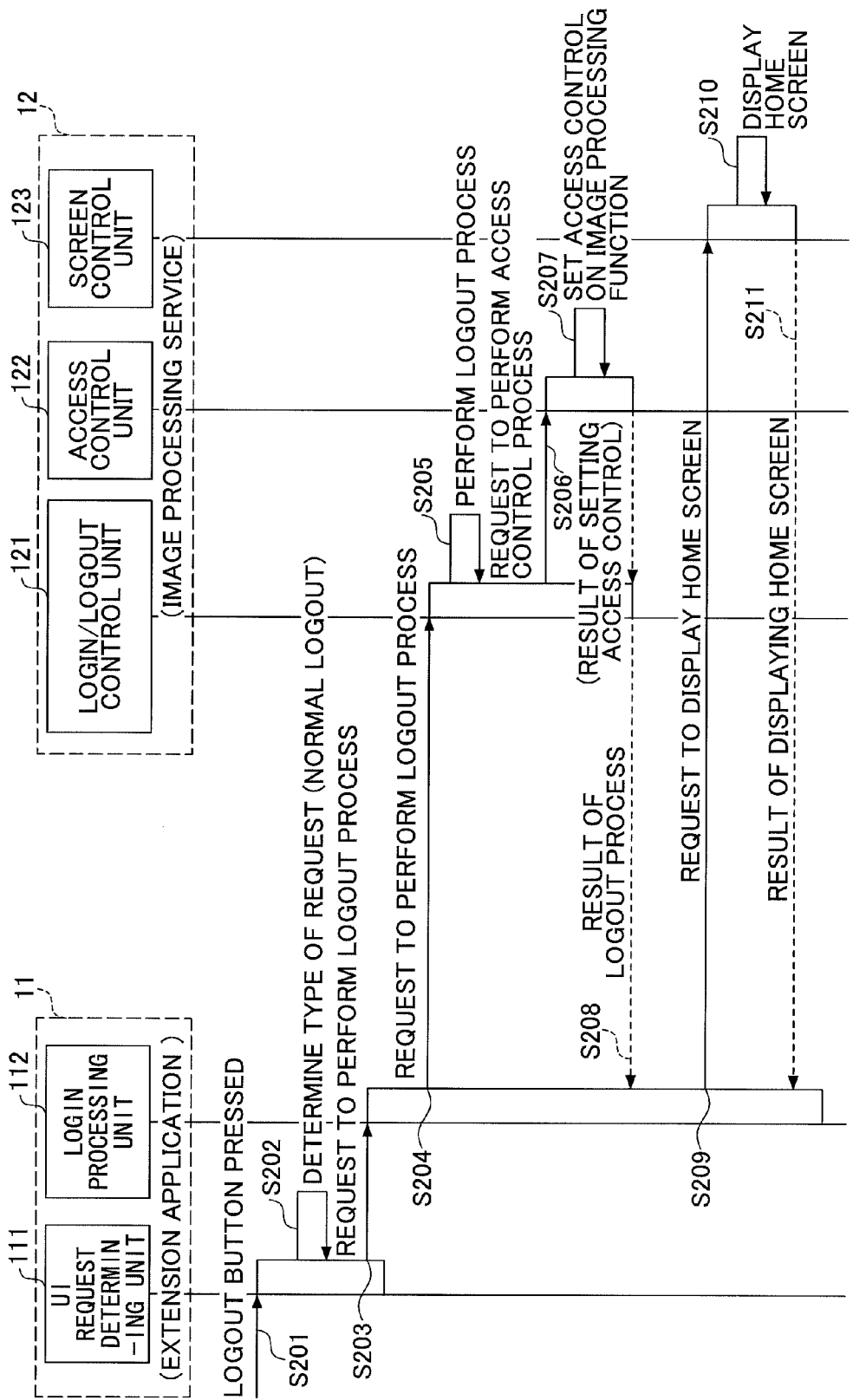

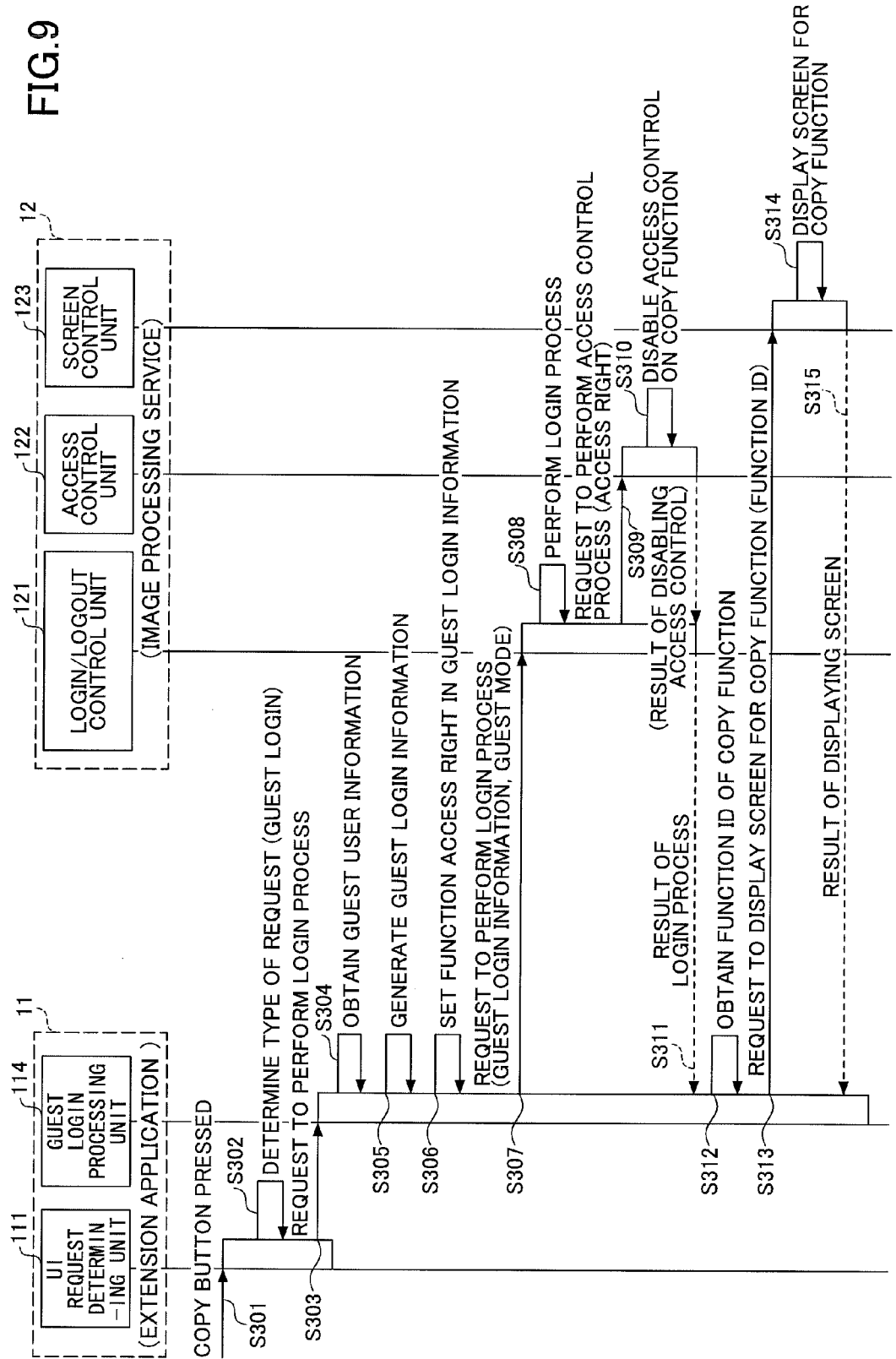

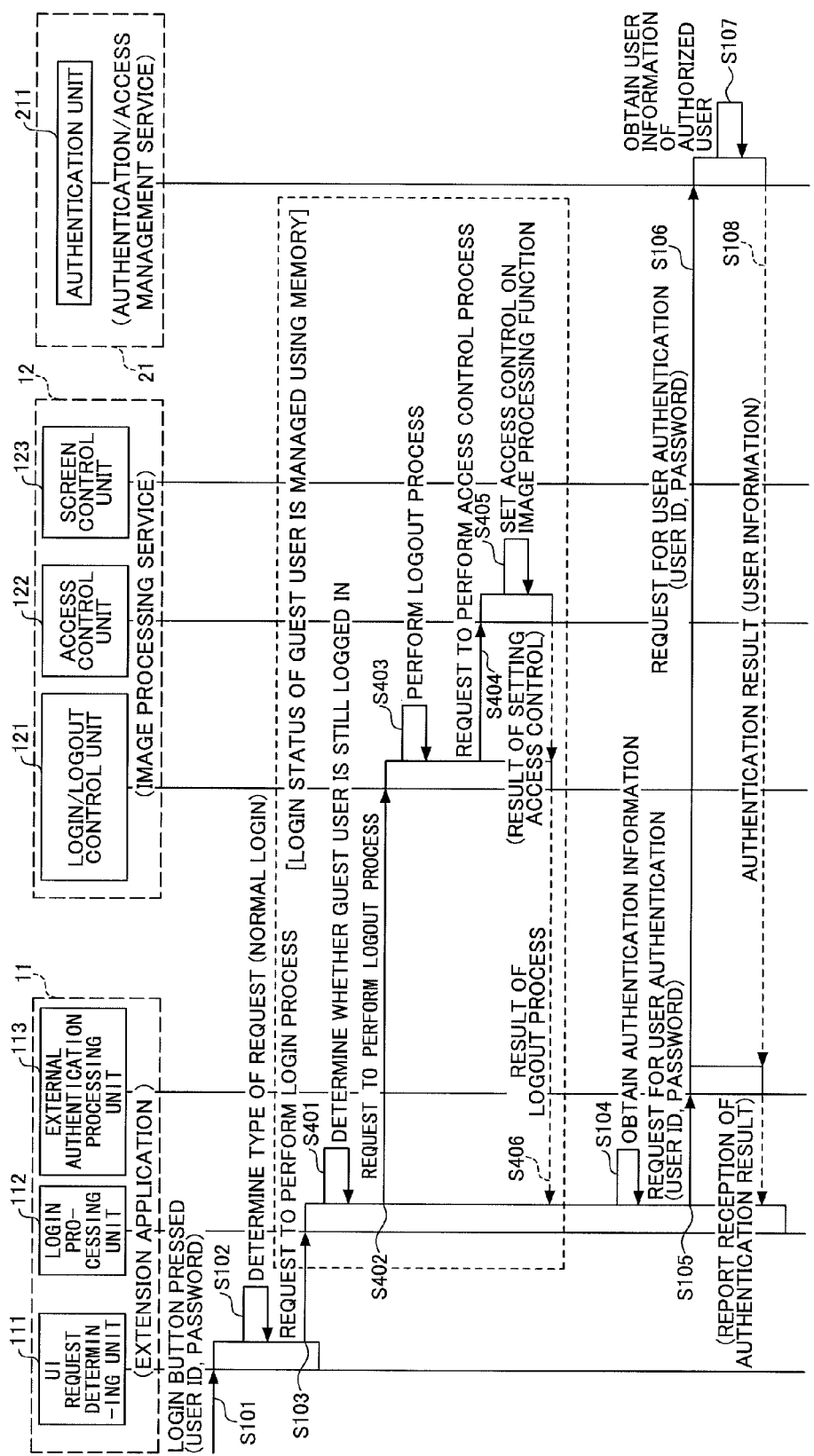

IMAGE PROCESSING APPARATUS, ACCESS CONTROL METHOD, AND STORAGE MEDIUM

CROSS-REFERENCE TO RELATED APPLICATION

The present application is based upon and claims the benefit of priority of Japanese Patent Application No. 2011-013737 filed on Jan. 26, 2011, the entire contents of which are incorporated herein by reference.

BACKGROUND OF THE INVENTION

1. Field of the Invention

An aspect of this disclosure relates to a technology for controlling access to functions of an image processing apparatus.

2. Description of the Related Art

Recent image processing apparatuses include various functions to meet the diversified demand of users. In such an image processing apparatus, various image processing services are provided to the users by respective functions installed in the image processing apparatus and by combinations (or through collaboration) of the functions.

Also, an image processing apparatus generally includes a function for controlling access to functions of the image processing apparatus based on user authentication to prevent unauthorized use and information leakage. For example, Japanese Laid-Open Patent Publication No. 2004-289302 discloses a technology where an image processing apparatus logs into a server on a network to access a user database in the server and obtain information on the access rights of a user, and controls access of the user to functions of the image processing apparatus based on the access rights.

In the disclosed technology, the image processing apparatus displays a screen for user authentication to authenticate a user requesting an access-controlled function. If the user is not an authorized user (i.e., a registered user having access rights), the image processing apparatus locks the operation screen to prevent the user from using the requested function.

In related-art image processing apparatuses, access of a guest user to an access-controlled function is enabled, for example, by disabling access control on the function or by providing authentication information for the guest user (i.e., without disabling access control on the function).

With the former method, since user authentication is not performed to allow the guest user to access the function, it is not possible to record a usage history of the function in association with the guest user. With the latter method, it is possible to record a usage history of the function for the guest user. However, the latter method makes it necessary for the guest user to enter the authentication information each time when using the function and therefore complicates user operations.

Generally, frequently-used image processing services or functions (e.g., a copy function) are made available for guest users. Therefore, an image processing apparatus is preferably capable of recording usage histories of guest users and allowing the guest users to use functions with simple and easy operations.

SUMMARY OF THE INVENTION

In an aspect of this disclosure, there is provided an image processing apparatus that includes a user interface unit configured to receive an operation event indicating a request to use an image processing function; a request determining unit configured to determine whether the request is from a guest user based on the received operation event; a guest login processing unit configured to generate guest login information including a guest user identifier and access right information of the guest user if the request is from the guest user and to send a login request to request a login process for the guest user based on the guest login information; an access control unit configured to disable access control on the image processing function in response to the login request based on the access right information in the guest login information; and a usage history recording unit configured to record a usage history of the image processing function in association with the guest user based on the guest user identifier in the guest login information.

BRIEF DESCRIPTION OF THE DRAWINGS

FIG. 6 is a table illustrating exemplary guest user information;

FIG. 7 is a sequence chart illustrating an exemplary process performed when an authentication-requesting user logs in;

FIG. 8 is a sequence chart illustrating an exemplary process performed when an authentication-requesting user logs out;

FIG. 9 is a sequence chart illustrating an exemplary process performed when a guest user logs in; and FIG. 10 is a sequence chart illustrating an exemplary process performed when a guest user logs out.

DESCRIPTION OF THE PREFERRED EMBODIMENTS

Preferred embodiments of the present invention are described below with reference to the accompanying drawings.

<System Configuration>

Figure 1:
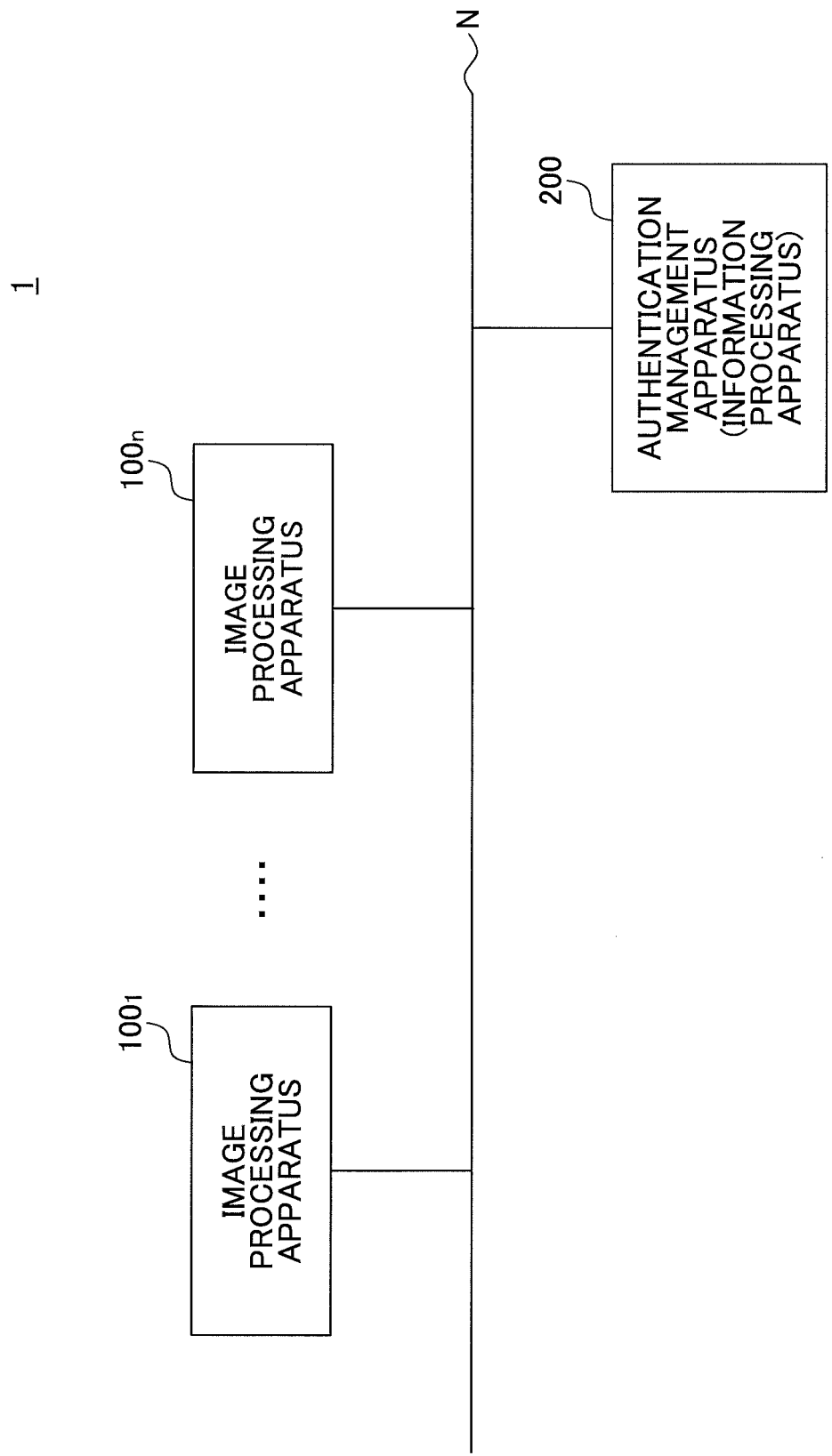
FIG. 1 is a drawing illustrating an exemplary configuration of an access control system.

FIG. 1 is a drawing illustrating an exemplary configuration of an access control system 1 according to an embodiment.

As illustrated in FIG. 1, the access control system 1 may include image processing apparatuses $100_1$ through $100_n$ (may be called the image processing apparatus 100 for descriptive purposes) and an authentication management apparatus 200 that are connected via a data communication channel N such as a network (e.g., a local area network (LAN)).

The image processing apparatus 100 includes image processing functions such as a copy function, a scan function, and a print function. The authentication management apparatus 200 is an information processing apparatus that authenticates users of the image processing apparatus 100.

The image processing apparatus 100 requests the user to input authentication information via its display screen. Based on the input authentication information, the image processing apparatus 100 requests the authentication management apparatus 200 to authenticate the user. If the user is successfully authenticated (the user is hereafter called the authenticated user), the image processing apparatus 100 allows the user to use (or access) an image processing function(s) corresponding to the access rights of the user. Meanwhile, if the user is not successfully authenticated, the image processing apparatus 100 locks its operation screen to prevent the user from using the image processing functions.

With the above configuration, the access control system 1 can provide an access control service to users.

<Hardware Configuration>

Figure 2:
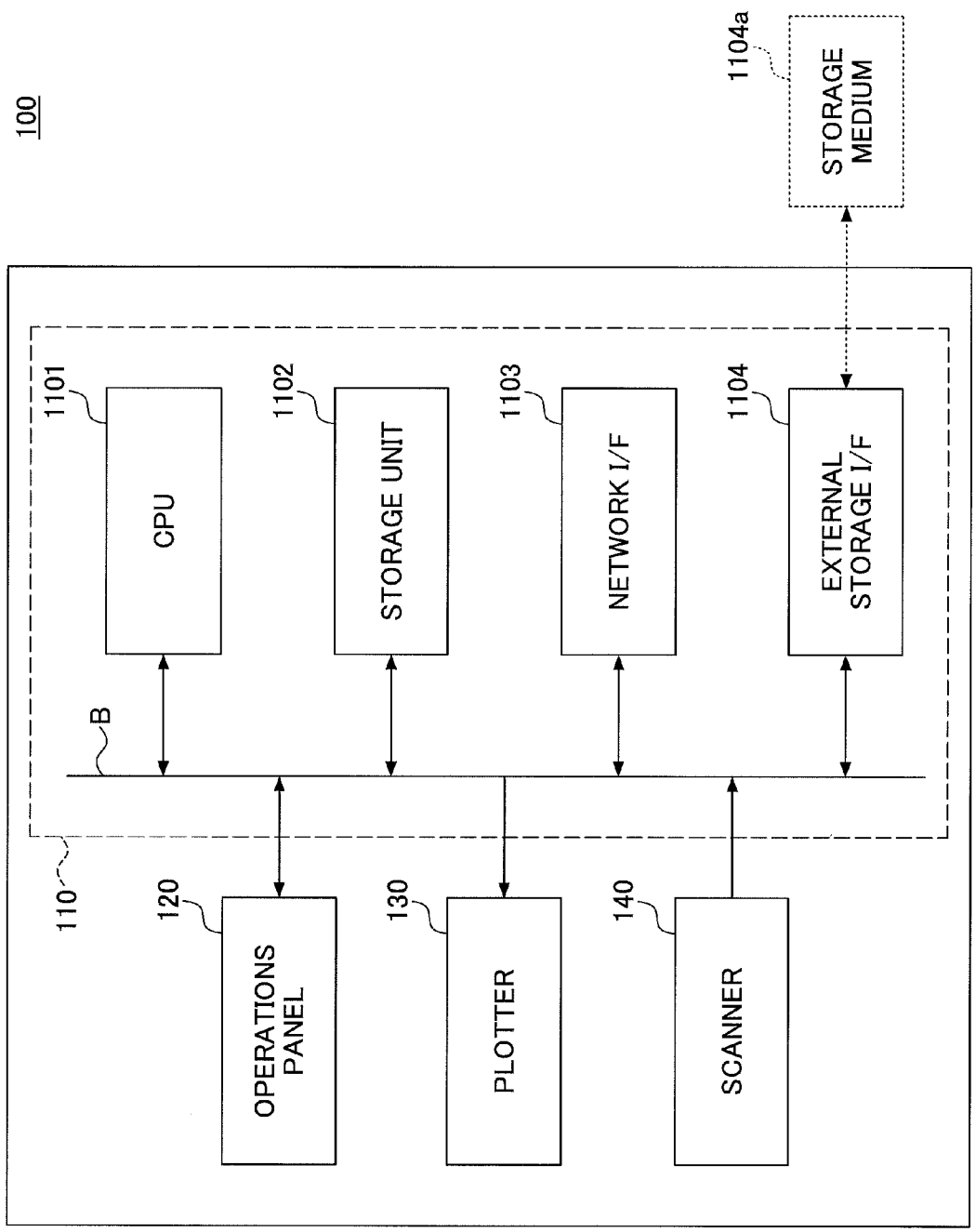
FIG. 2 is a block diagram illustrating an exemplary hardware configuration of an image processing apparatus.

FIG. 2 is a block diagram illustrating an exemplary hardware configuration of the image processing apparatus 100 according to an embodiment.

As illustrated in FIG. 2, the image processing apparatus 100 may include a controller 110, an operations panel 120, a plotter 130, and a scanner 140 that are connected to each other via a bus B.

The operations panel 120 includes a display unit for providing information such as apparatus information to the user and an input unit for receiving user inputs such as settings and instructions. The plotter 130 includes an image forming unit for forming an image on a recording medium (e.g., paper). For example, the plotter 130 forms an image by electrophotography or inkjet printing. The scanner 140 optically scans a document and generates image data (a scanned image).

The controller 110 includes a central processing unit (CPU) 1101, a storage unit 1102, network I/F 1103, and an external storage I/F 1104 that are connected to each other via the bus B.

The CPU 1101 executes programs and thereby controls the entire image processing apparatus 100. The storage unit 1102 stores programs and data (e.g., image data). The storage unit 1102, for example, includes a random access memory (RAM) implemented by a volatile memory, a read only memory (ROM) implemented by a non-volatile memory, and a hard disk drive (HDD) as a mass storage. The RAM is used as a work area (a storage area where programs and data are temporarily stored) by the CPU 1101. The ROM and the HDD store the programs and data. The CPU 1101 loads the programs from the ROM or the HDD into the RAM and executes the loaded programs.

The network I/F 1103 is an interface for connecting the image processing apparatus 100 to a data communication channel N such as a network. The external storage I/F 1104 is an interface for connecting a storage medium 1104a used as an external storage to the image processing apparatus 100. The image processing apparatus 100 can communicate with other apparatuses (e.g., the authentication management apparatus 200) via the network I/F 1103.

Examples of the storage medium 1104a include a secure digital (SD) memory card, a universal serial bus (USB) memory, a compact disk (CD), and a digital versatile disk (DVD). The image processing apparatus 100 can read and write data from and to the storage medium 1104a via the external storage I/F 1104.

With the above hardware configuration, the image processing apparatus 100 can provide various image processing services (or image processing functions).

<Software Configuration>

Figure 3:
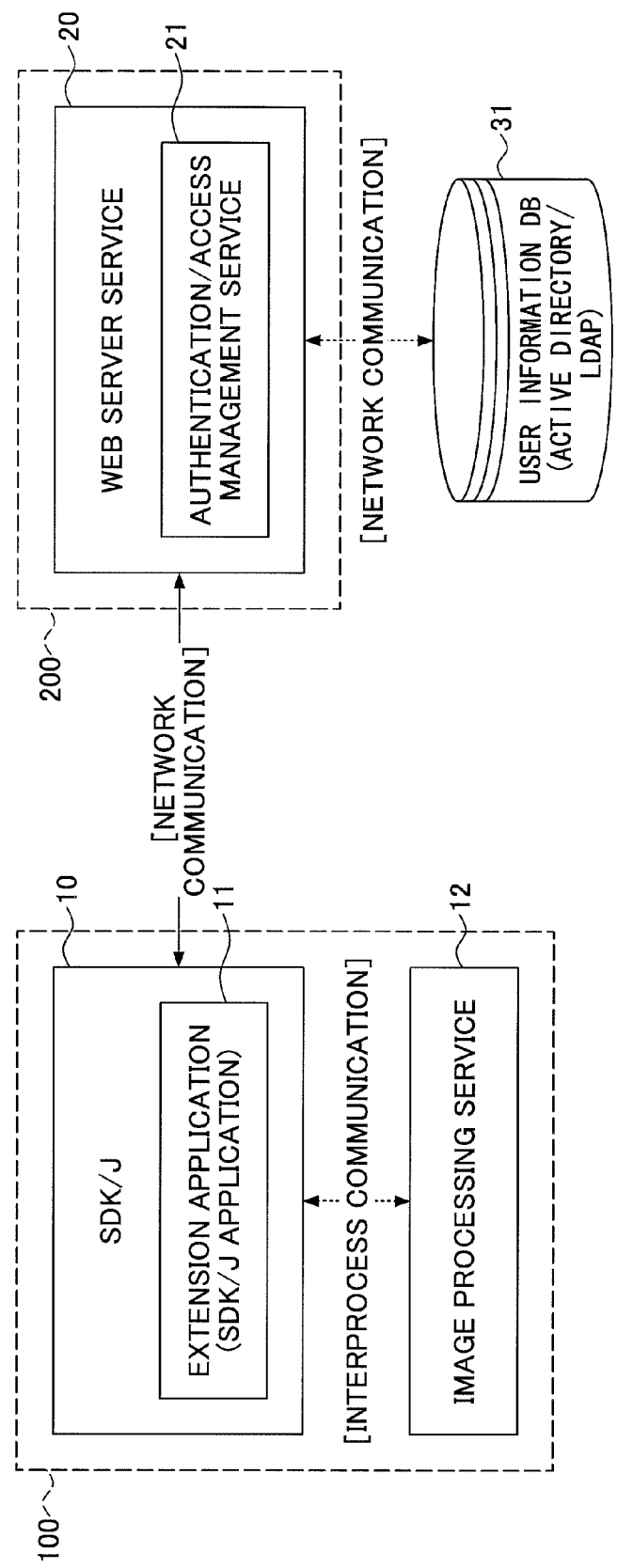
FIG. 3 is a drawing illustrating an exemplary software configuration of an access control system.

FIG. 3 is a drawing illustrating an exemplary software configuration of the access control system 1.

As illustrated in FIG. 3, the image processing apparatus 100 may include a software development kit type-J (SDK/J) 10 and an image processing service 12. The SDK/J 10 is software that includes tools for developing software programs in the Java (trademark or registered trademark) language and provides an operating environment for the developed software programs (SDK/J applications). The image processing service 12 is software that provides image processing functions such as a copy function, a scan function, and a print function.

In this example, an SDK/J application called an extension application 11 runs on the SDK/J 10. The extension application 11 makes it possible to combine image processing functions and to extend image processing functions (or to provide extension functions). An access control function of this embodiment is an example of an extension function and is implemented by the extension application 11.

The SDK/J 10 sends and receives data to and from the image processing service 12 via interprocess communications. This enables the extension application 11 to collaborate with image processing functions implemented by the image processing service 12.

With the above software configuration, the image processing apparatus 100 can perform access control for image processing functions.

The authentication management apparatus 200 may include a Web server service 20. The Web server service 20 is software that provides a Web server function. In this embodiment, an authentication/access management service 21 runs on the Web server service 20. The authentication/access management service 21 is software that provides a user authentication function for users of the image processing apparatus 100.

The Web server service 20 sends and receives data to and from a user information database (DB) 31 via network communications. The user information DB 31 centrally manages various types of information (e.g., user information such as authentication information and access right information) on users of the image processing apparatus 100 using the Active Directory technology. The user information DB 31 has a Lightweight Directory Access Protocol (LDAP) function and provides user information to functions implemented by the Web server service 20 running on the authentication management apparatus 200. The authentication/access management service 21 performs user authentication based on user information provided by the user information DB 31.

With the above software configuration, the authentication management apparatus 200 can perform authentication for users of image processing functions.

The Web server service 20 sends and receives data to and from the SDK/J 10 via network communications. This enables the authentication/access management service 21 to collaborate with the access control function implemented by the extension application 11 running on the image processing apparatus 100.

With the above software configuration, the access control system 1 can perform access control for image processing functions in combination with user authentication.

In other words, with the above software configuration, the access control system 1 can provide an access control service (access control function).

<Access Control Function>

An access control function according to an embodiment is described below.

When receiving a request (e.g., a user operation or a user input) to access (or use) an image processing function, the image processing apparatus 100 determines whether the request is from a guest user. When it is determined that the request is from the guest user, the image processing apparatus 100 performs a login process for the guest user. In the login process for the guest user, the extension application 11 generates guest login information including a user identifier and access right information (indicating a right to access a given image processing function(s)) of the guest user based on predefined guest user information, and sends the generated guest login information to the image processing service 12 to request the image processing service 12 to perform a login process for the guest user. Based on the access right information in the guest login information, the image processing service 12 disables (or removes) access control on the image processing function (hereafter called an access-allowed function) that the guest user is allowed to use and executes the access-allowed function. Then, the image processing apparatus 100 records a usage history of the access-allowed function in association with the guest user based on the user identifier in the guest login information. The image processing apparatus 100 includes the access control function as described above.

In related-art access control methods, access of a guest user to a function is enabled, for example, by disabling access control on the function or by providing authentication information for the guest user (i.e., without disabling access control on the function). With the former method, since user authentication is not performed to allow the guest user to access the function, it is not possible to record a usage history of the function in association with the guest user. With the latter method, it is possible to record a usage history of the function for the guest user. However, the latter method makes it necessary for the guest user to enter the authentication information each time when using the function and therefore complicates user operations.

Meanwhile, the image processing apparatus 100 of this embodiment automatically generates login information including a user identifier and access right information for the guest user and controls access to image processing functions based on the generated login information.

This configuration enables a guest user to use an image processing function with a simple operation and also makes it possible to record a usage history in association with the guest user.

An exemplary functional configuration of the access control system 1 is described below.

Figure 4:
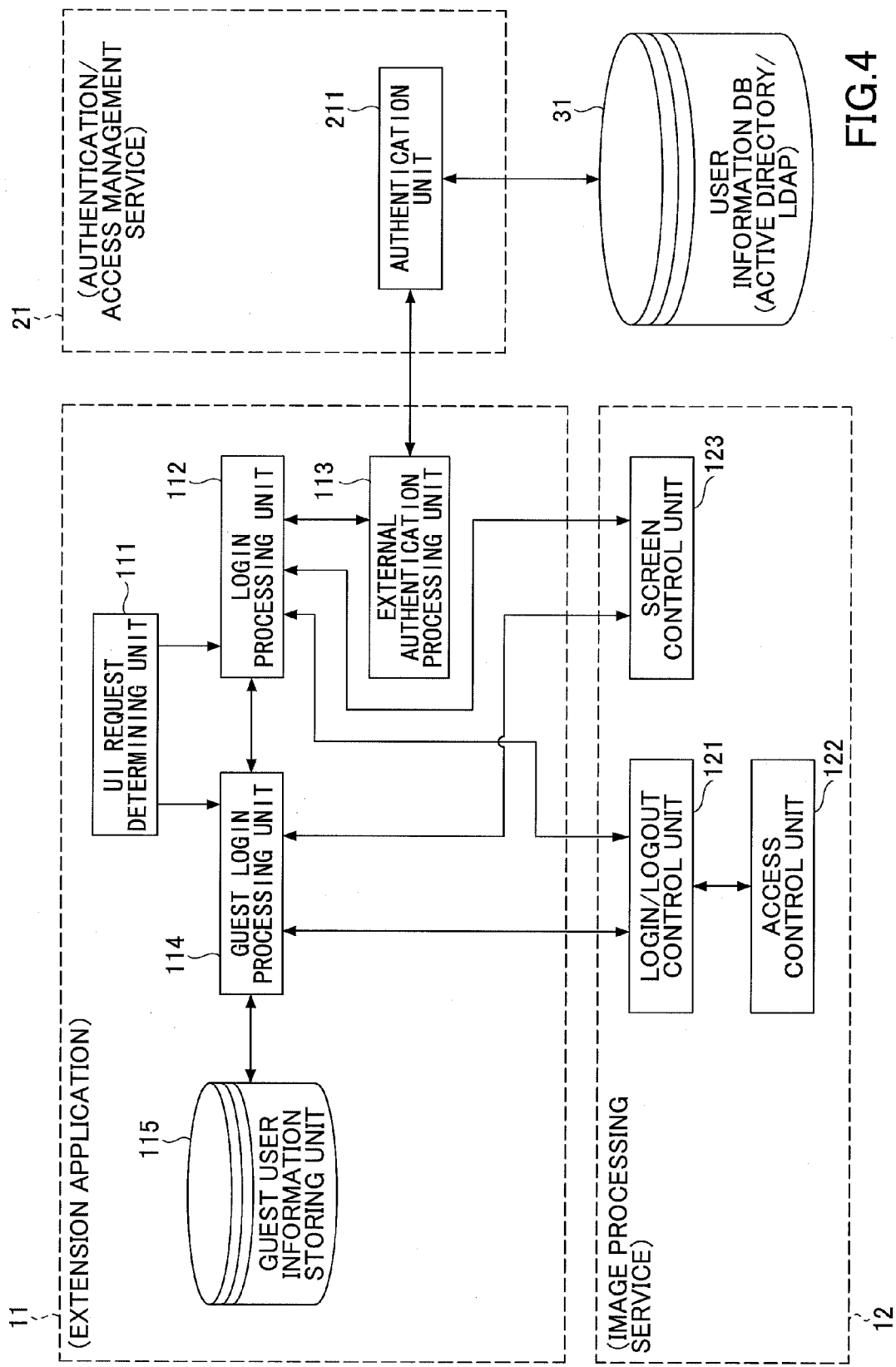
FIG. 4 is a block diagram illustrating an exemplary functional configuration of an access control system.

FIG. 4 is a block diagram illustrating an exemplary functional configuration of the access control system 1.

As illustrated in FIG. 4, the extension application 11 may include a user interface (UI) request determining unit 111, a login processing unit 112, an external authentication processing unit 113, and a guest login processing unit 114 as functional units. The functional units of the extension application 11 implement the access control function in collaboration with functional units of the image processing service 12 and the authentication/access management service 21. The image processing service 12 may include a login/logout control unit 121, an access control unit 122, and a screen control unit 123. The authentication/access management service 21 may include an authentication unit 211.

<Functional Units of Extension Application>

The UI request determining unit 111 is a functional unit that determines whether a received request (e.g., a user operation or a user input) to access (or use) an image processing function is from a guest user. For example, the UI request determining unit 111 receives an operation event from an operation screen displayed on the operations panel 120 of the image processing apparatus 100. The operation event may indicate a request to use an image processing function which is entered by operating the operation screen on the operations panel 120. The operations panel 120 (or the display unit) is an example of a user interface unit for receiving (or generating) an operation event in response to a user operation. Any other device may also be used as the user interface unit.

Figure 5:
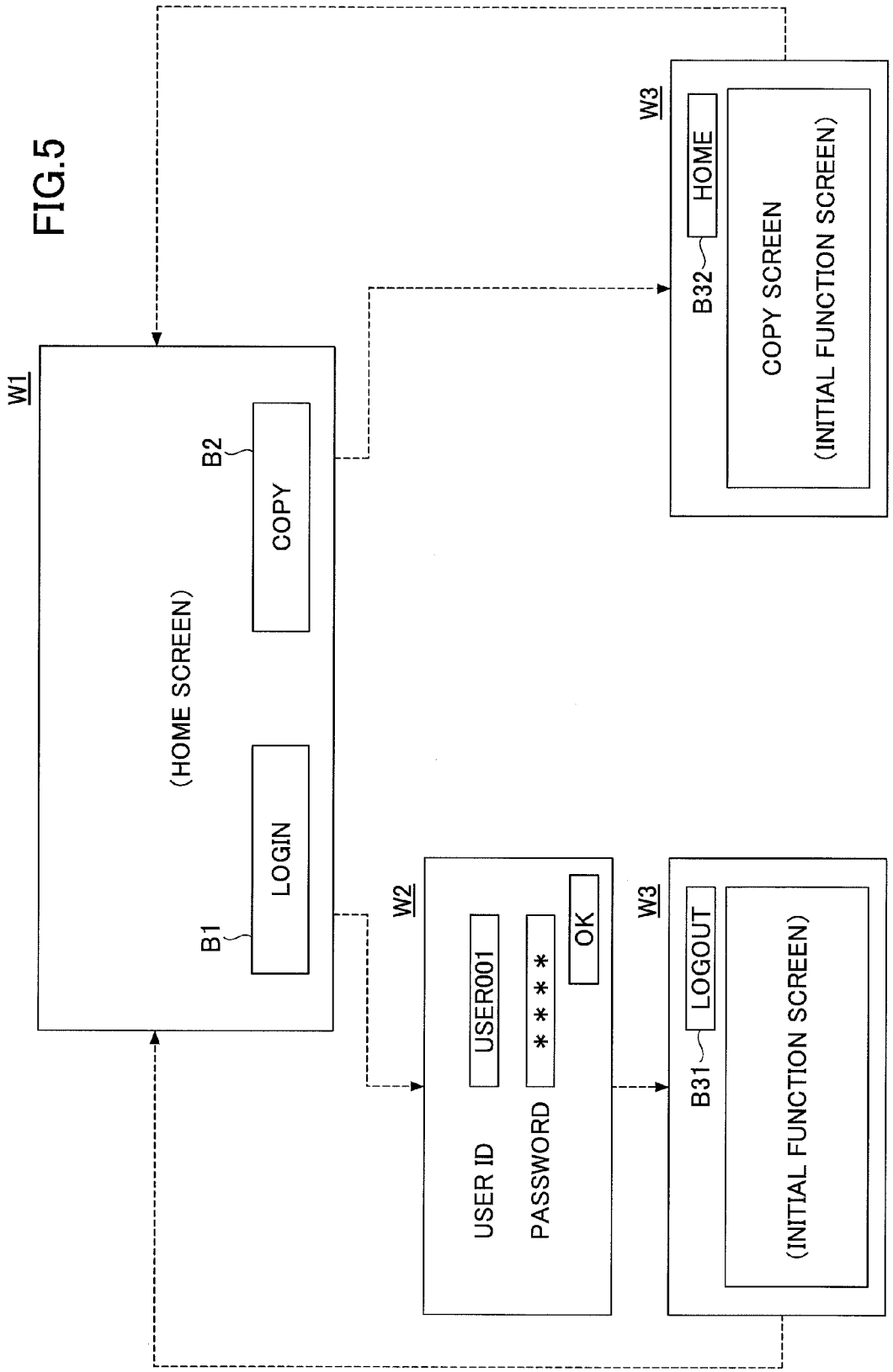
FIG. 5 is a drawing illustrating exemplary operation screens.

FIG. 5 is a drawing illustrating exemplary operation screens.

As illustrated in FIG. 5, a home screen W1, which is an example of an initial operation screen, includes graphical user interfaces (GUIs) such as a login button B1 and a copy button B2. The user presses one of the GUIs to log into the image processing apparatus 100.

For example, when the login button B1 is pressed on the home screen W1, a login screen W2 is displayed (operational screens are switched). On the login screen W2, the user enters authentication information including a user ID (user identifier) for identifying the user and a password and presses an OK button to request to use an image processing function. If the user is successfully authenticated (i.e., if the user is an authorized user), an initial function screen W3 for an image processing function corresponding to the access rights of the user is displayed.

Meanwhile, when the copy button B2 is pressed on the home screen W1, an operation screen for the copy function is displayed as the initial function screen W3. Thus, when the copy button B2 is pressed, the initial function screen W3 (an operation screen for an image processing function) is displayed without requesting the user to enter authentication information.

In this example, the copy button B2 is provided on the home screen W1 since the copy function is frequently used by users including the guest user. Thus, in this embodiment, a guest user operation button (e.g., the copy button B2) that does not involve user authentication is provided on the home screen W1 in addition to a login operation button (e.g., the login button B1) that involves user authentication. This configuration allows the guest user to display an operation screen for an image processing function corresponding to the access rights of the guest user without entering authentication information, and thereby enables the guest user to use the image processing function with a simple operation.

As is apparent from the above descriptions, pressing the login operation button and pressing the guest user operation button generate different operation events. More specifically, an operation event generated when the login operation button is pressed includes the authentication information of the user, but an operation event generated when the guest user operation button is pressed does not include authentication information. When an operation button is pressed and an operation event is generated, the UI request determining unit 111 determines whether the operation event includes authentication information and thereby determines whether the received request to access an image processing function is from the guest user. If the operation event includes authentication information, the UI request determining unit 111 determines that a login process (hereafter called a normal login process) is requested by a user (hereafter called an authentication-requesting user) other than the guest user. Meanwhile, if the operation event does not include authentication information, the UI request determining unit 111 determines that access to an image processing function (or a guest login process) is requested by the guest user.

A button ID (operation button identifier) is assigned to each operation button. The UI request determining unit 111 also determines the type of an operation button pressed based on the operation button identifier included in the operation event and thereby determines whether a normal login process or a logout process (normal logout process) is requested by the user.

Referring back to FIG. 4, the login processing unit 112 is a functional unit that performs login and logout processes for authentication-requesting users. The login processing unit 112 performs login and logout processes as described below in response to requests from the UI request determining unit 111.

When receiving a login request of a user from the UI request determining unit 111, the login processing unit 112 obtains an authentication result from the authentication/access management service 21 of the authentication management apparatus 200 based on the authentication information of the user, and generates login information including identification information and access right information of the user based on the obtained authentication result. When the user is an authorized user (i.e., when the user is successfully authenticated), the authentication result obtained from the authentication/access management service 21 includes user information of the user (authorized user) which is registered beforehand in the user information DB 31.

The user information may include a user identifier of the user, access right information indicating access rights assigned to the user, i.e., one or more image processing functions (access-allowed functions) that the user is allowed to access, and initial function information indicating an image processing function (initial function) to be executed when the user logs in. The access right information and the initial function information are represented by function IDs (function identifiers) for identifying image processing functions. For example, the access right information may include one or more function IDs identifying access-allowed functions, and the initial function information may include a function ID of the initial function.

Thus, the login processing unit 112 generates login information based on the user identifier and the access right information in the user information obtained as the authentication result. The login processing unit 112 sends the generated login information to the image processing service 12 to request the image processing service 12 to perform a login process. As a result, the user identifier and the access-allowed function(s) of the user requesting the login process are specified in the image processing service 12. Also, when receiving the result of the login process from the image processing service 12, the login processing unit 112 requests the image processing service 12 to display the initial function screen W3 based on the initial function information in the user information. As a result, the initial function of the user is specified in the image processing service 12.

Meanwhile, when receiving a logout request from the UI request determining unit 111, the login processing unit 112 requests the image processing service 12 to perform a logout process. Then, when receiving the result of the logout process from the image processing service 12, the login processing unit 112 requests the image processing service 12 to display the home screen W1.

The external authentication processing unit 113 is a functional unit that requests the authentication/access management service 21 to perform user authentication. When receiving a request from the login processing unit 112, the external authentication processing unit 113 sends the authentication information of the user to the authentication/access management service 21 (i.e., to the authentication management apparatus 200) and thereby requests the authentication/access management service 21 to perform user authentication. In response, the authentication/access management service 21 (i.e., the authentication management apparatus 200) sends an authentication result to the external authentication processing unit 113. Then, the external authentication processing unit 113 sends the authentication result to the login processing unit 112.

The guest login processing unit 114 is a functional unit that performs a login process for the guest user. The guest login processing unit 114 performs a login process for the guest user as described below in response to a request from the UI request determining unit 111.

When receiving a login request of the guest user from the UI request determining unit 114, the guest login processing unit 114 obtains guest user information from a guest user information storing unit 115, and generates guest login information including identification information and access right information of the guest user based on the obtained guest user information. The guest user information storing unit 115 is, for example, implemented by a storage area of a storage unit (e.g., the storage unit 1102) of the image processing apparatus 100.

FIG. 6 is a table illustrating exemplary guest user information 115D.

The guest user information storing unit 115 stores, for example, the guest user information 115D as illustrated in FIG. 6. The guest user information 115D may include a user identifier field and an access rights field that are associated with each other. The user identifier field contains a user identifier for identifying the guest user, and the access rights field contains access right information indicating access rights assigned to the guest user, i.e., an image processing function(s) (access-allowed function) that the guest user is allowed to access. The values or information in the guest user information 115D may be specified beforehand by, for example, the administrator. Although in the example of FIG. 6, only the access rights to the copy function is assigned to the guest user, access rights to multiple image processing functions may be assigned to the guest user. Also, multiple guest users may be defined and access rights to different combinations of image processing functions may be assigned to the guest users.

The guest login processing unit 114 obtains the guest user information 115D as described below. Based on an operation event received by the UI request determining unit 111, the guest login processing unit 114 identifies an image processing function (requested function) that the guest user requested by pressing an operation button. The guest login processing unit 114 accesses the guest user information storing unit 115 and obtains access right information where the identified image processing function is specified and the user identifier associated with the access right information as the guest user information 115D.

Based on the user identifier and the access right information in the obtained guest user information 115D, the guest login processing unit 114 generates guest login information. Then, the guest login processing unit 114 sends the generated guest login information to the image processing service 12 to request the image processing service 12 to perform a login process. As a result, the user identifier and the access-allowed function(s) of the guest user are specified in the image processing service 12. Also, when receiving the result of the login process from the image processing service 12, the guest login processing unit 114 requests the image processing service 12 to display the initial function screen W3 based on the access right information in the guest user information 115D. As a result, the initial function of the guest user is specified in the image processing service 12.

Thus, the image processing apparatus 100 of this embodiment automatically generates guest login information including a user identifier and access right information of the guest user and controls access to image processing functions based on the generated guest login information.

An exemplary logout process for the guest user is described below.

Since the guest user can use (or access) an access-allowed function by simply selecting the access-allowed function (or by pressing the corresponding button) on the home screen W1 as illustrated in FIG. 5, the guest login process is transparent to the guest user. Therefore, displaying a logout button B31 on the initial function screen W3 as in the case of an authentication-requesting user results in requesting the guest user to perform an unexpected operation.

For the above reason, in the case of the guest user, a home button B32 is displayed on the initial function screen W3. Even after the home button B32 is pressed and the home screen W1 is displayed, the guest user remains logged in. In other words, the guest login processing unit 114 does not perform a logout process for the guest user.

Instead, when a normal login process involving user authentication is requested after the guest user logs in, the login processing unit 112 performs a logout process for the guest user. When receiving a login request from the UI request determining unit 111, the login processing unit 112 determines whether the guest user is still logged in based on whether guest login information is retained in a memory of the image processing apparatus 100 (i.e., whether the guest login information has been generated). If the guest login information is retained in the memory (i.e., if the guest user is still logged in), the login processing unit 112 requests the image processing service 12 to perform a logout process.

<Functional Units of Authentication/Access Management Service>

The authentication unit 211 is a functional unit that performs user authentication in response to an authentication request. When receiving an authentication request from the extension application 11, the authentication unit 211 performs user authentication by accessing the user information DB 31 based on authentication information received from the extension application 11 (i.e., from the image processing apparatus 100) and sends an authentication result to the extension application 11 (i.e., to the image processing apparatus 100). When the user is not an authorized user (i.e., if the user is not successfully authenticated), the authentication unit 211 sends an authentication result indicating failure of the user authentication. Meanwhile, if the user is an authorized user (i.e., if the user is successfully authenticated), the authentication unit 211 sends an authentication result including user information such as the user identifier, the access right information, and the initial function information of the user (authorized user).

<Functional Units of Image Processing Service>

The login/logout control unit 121 is a functional unit that controls login and logout processes in response to login and logout requests. When receiving a login request from the extension application 11, the login/logout control unit 121 performs a login process to disable access control on an image processing function(s) based on login information (or guest login information) received together with the login request.

Meanwhile, when receiving a logout request from the extension application 11, the login/logout control unit 121 performs a logout process to set access control on an image processing function(s). More specifically, the login/logout control unit 121 determines whether a requested job requested by a logged-in user has been completed and thereby determines whether it is appropriate to perform the logout process for the user. If the requested job has been completed (i.e., if it is appropriate to perform the logout process for the user), the login/logout control unit 121 performs the logout process to set access control on an image processing function(s).

The access control unit 122 is a functional unit that controls access to image processing functions. The access control unit 122 performs an access control process for a login process based on access right information (in the login information) received from the login/logout control unit 121. More specifically, the access control unit 122 identifies an image processing function(s) based on the received access right information (a function identifier(s)) and disables access control on the identified image processing function. In other words, the access control unit 122 disables access control on an image processing function(s) (access-allowed function(s)) that a logged-in user is allowed to use. Meanwhile, when requested by the login/logout control unit 121 to perform an access control process for a logout process, the access control unit 122 sets access control on an image processing function(s), i.e., restores access control on the image processing function(s).

The access control unit 122 sends the result of the access control process (the result of disabling or setting access control) to the login/logout control unit 121. Then, the login/logout control unit 121 sends the result of the login/logout process to the extension application 11 (login/logout requester).

The screen control unit 123 is a functional unit that controls operation screens for image processing functions in response to display requests. When receiving a display request from the extension application 11, the screen control unit 123 displays an operation screen (initial function screen) for a corresponding image processing function based on initial function information received together with the display request. Then, the screen control unit 123 sends the result of displaying the operation screen to the extension application 11 (display requester).

As described above, in the access control system 1 of this embodiment, the access control function is provided through collaboration among the functional units. In other words, the access control function of this embodiment is implemented by executing software programs installed in apparatuses (e.g., the image processing apparatus 100 and the authentication management apparatus 200) constituting the access control system 1. More particularly, in each apparatus, the software programs are loaded by a processing unit (e.g., a CPU) from a storage unit (e.g., an HDD or a ROM) into a memory (e.g., a RAM) and are executed to perform processes as described below to implement the access control function.

Exemplary processes (collaboration among functional units) for controlling access to image processing functions are described below.

<Process Performed when Authentication-Requesting User Logs In>

Figure 7:
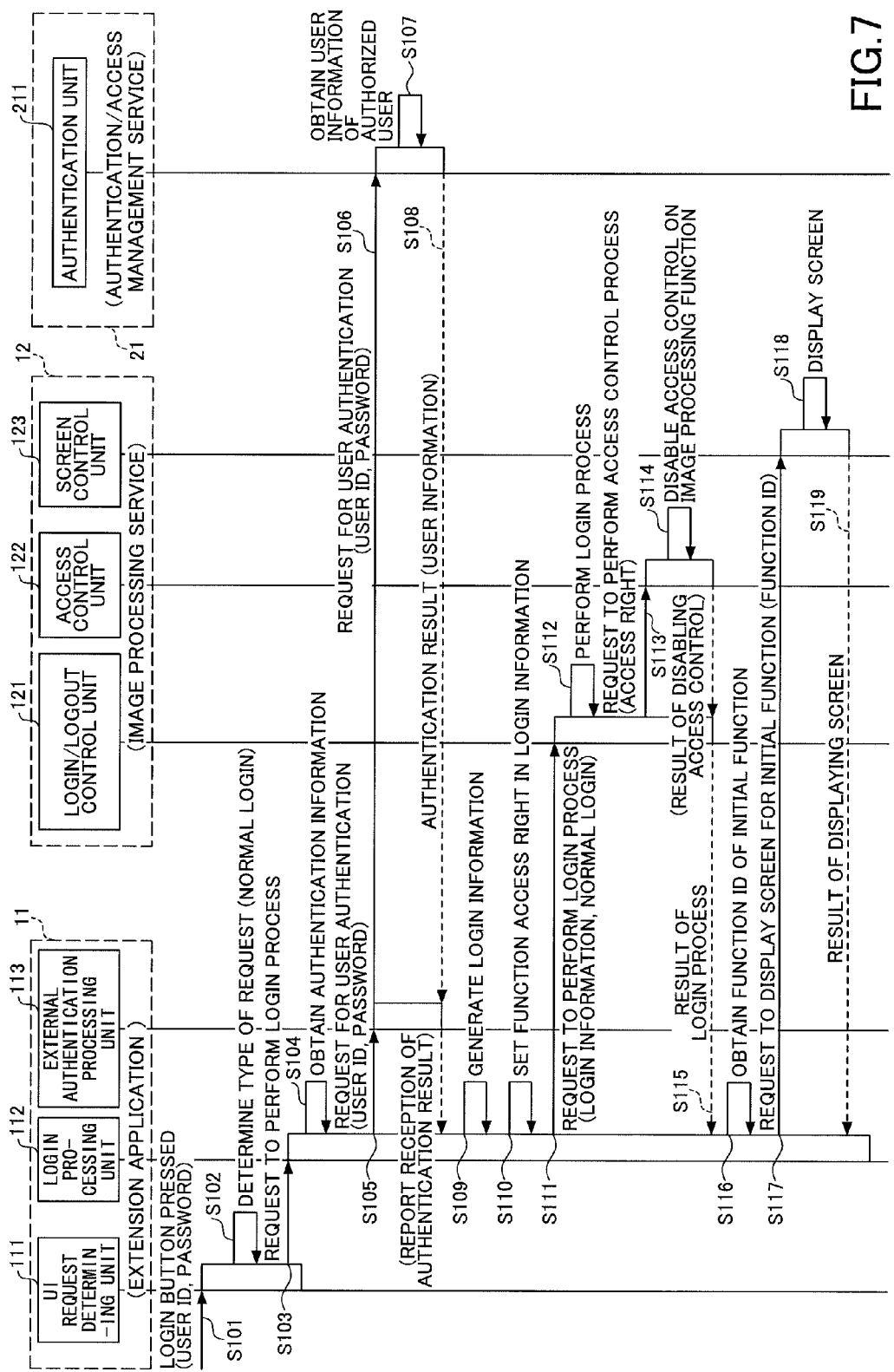

FIG. 7 is a sequence chart illustrating an exemplary process performed when an authentication-requesting user logs in. In FIG. 7, it is assumed that the login button B1 on the home screen W1 of FIG. 5 is pressed, authentication information is entered on the login screen W2, and the initial function screen W3 is displayed.

As illustrated in FIG. 7, when the login button B1 is pressed on the home screen W1, the UI request determining unit 111 of the extension application 11 receives an operation event including authentication information such as a user ID and a password entered by a user on the login screen W2 (step S101).

Since the operation event includes the authentication information, the UI request determining unit 111 determines that a request for a normal login process is received (step S102). Then, based on the determination result, the UI request determining unit 111 requests the login processing unit 112 to perform a normal login process (step S103).

The login processing unit 112 obtains the authentication information from the UI request determining unit 111 (step S104), sends the obtained authentication information to the external authentication processing unit 113, and thereby requests the external authentication processing unit 113 to request the authentication/access management service 21 to perform user authentication (step S105).

The external authentication processing unit 113 sends the authentication information to the authentication unit 211 of the authentication/access management service 21 to request user authentication (step S106). The authentication unit 211 performs user authentication by accessing the user information DB 31 based on the authentication information received from the external authentication processing unit 113.

When the user is an authorized user (i.e., when the user is successfully authenticated), the authentication unit 211 obtains user information of the user (authorized user) from the user information DB 31 (step S107). Next, the authentication unit 211 sends an authentication result including the obtained user information to the external authentication processing unit 113 of the extension application 11 (step S108). Thus, the external authentication processing unit 113 receives the user information from the authentication unit 211. The user information may include a user ID (user identifier) of the user, a function ID(s) indicating an access-allowed function(s) (access right information), and a function ID of an initial function (initial function information).

The external authentication processing unit 113 sends the received user information to the login processing unit 112 that has requested the user authentication and thereby reports that the authentication result has been received.

When the user is an authorized user (i.e., when the user information is received), the login processing unit 112 generates login information including the user ID of the user (authorized user) based on the user information (step S109). Next, the login processing unit 112 sets the function ID(s) indicating the access-allowed function(s) (access right information) in the generated login information (step S110). As a result of the above steps, the login information is stored and retained in a memory (e.g., the RAM) of the image processing apparatus 100.

The login processing unit 112 sends the generated login information to the login/logout control unit 121 of the image processing service 12 to request the login/logout control unit 121 to perform a login process (step S111). In this step, the login processing unit 112 sets the login/logout control unit 121 to a normal login mode. The login/logout control unit 121 performs a login process for the user (authorized user) based on the login information received from the login processing unit 112 (step S112).

The login/logout control unit 121 also sends the access right information in the login information to the access control unit 122 to request the access control unit 122 to perform an access control process (step S113).

The access control unit 122 identifies an image processing function(s) based on the access right information (a function ID(s)) received from the login/logout control unit 121 and disables access control on the identified image processing function(s) (step S114). Then, the access control unit 122 reports the result of disabling access control to the login/logout control unit 121.

The login/logout control unit 121 sends the result of the login process to the login processing unit 112 of the extension application 11 requesting the login process (step S115).

The login processing unit 112 obtains the function ID of the initial function from the user information received as the authentication result (step S116). The login processing unit 112 sends the obtained function ID to the screen control unit 123 of the image processing service 12 to request the screen control unit 123 to display an operation screen for the initial function (step S117). The screen control unit 123 displays the operation screen (initial function screen) for the initial function based on the function ID received from the login processing unit 112 (step S118).

Then, the screen control unit 123 sends the result of displaying the initial function screen to the login processing unit 112 of the extension application 11 requesting to display the screen (step S119).

Thus, in the image processing apparatus 100 of this embodiment, access control on an image processing function (access-allowed function) is disabled based on access right information in login information of a user and the image processing function is executed. Also in the image processing apparatus 100, the user using the image processing function is identified based on the user identifier in the login information and a usage history of the image processing function is recorded in association with the user (or the user identifier). For this purpose, the image processing apparatus 100 may include a usage history recording unit that records usage history of an image processing function in association with a user based on a user identifier in login information.

Meanwhile, when a result indicating that the user is an unauthorized user (i.e., the user is not successfully authenticated) is received from the external authentication processing unit 113, the login processing unit 112 requests the screen control unit 123 of the image processing service 12 to display an authentication result screen for reporting that user authentication has failed. In response, the screen control unit 123 displays the authentication result screen.

Also, when a result indicating failure of the login process is received from the login/logout control unit 121 of the image processing service 12, the login processing unit 112 requests the screen control unit 123 of the image processing service 12 to display a login result screen for reporting that the login process has failed. In response, the screen control unit 123 displays the login result screen.

<Process Performed when Authentication-Requesting User Logs out>

FIG. 8 is a sequence chart illustrating an exemplary process performed when an authentication-requesting user logs out. In FIG. 8, it is assumed that the logout button B31 on the initial function screen W3 of FIG. 5 is pressed and the home screen W1 is displayed.

As illustrated in FIG. 8, when the logout button B31 is pressed on the initial function screen W3 displayed after the login process, the UI request determining unit 111 of the extension application 11 receives an operation event including a button ID (operation button identifier) of the logout button B31 (step S201).

Based on the button ID in the operation event, the UI request determining unit 111 determines the type of the operation button (the logout button B31) pressed and thereby determines that a request for a normal logout process is received (step S202). Then, based on the determination result, the UI request determining unit 111 requests the login processing unit 112 to perform a normal logout process (step S203).

The login processing unit 112 requests the login/logout control unit 121 of the image processing service 12 to perform a logout process (step S204). In this step, the login processing unit 112 sets the login/logout control unit 121 to a normal logout mode. The login/logout control unit 121 performs a logout process for the user in response to the request from the login processing unit 112 (step S205).

The login/logout control unit 121 also requests the access control unit 122 to perform an access control process on the image processing function(s) whose access control has been disabled (step S206).

In response to the request from the login/logout control unit 121, the access control unit 122 sets access control on the image processing function(s), i.e., restores access control on the image processing function(s) (step S207). Then, the access control unit 122 reports the result of setting access control to the login/logout control unit 121 requesting the access control process.

The login/logout control unit 121 sends the result of the logout process to the login processing unit 112 of the extension application 11 requesting the logout process (step S208). As a result, the login information retained in the memory of the image processing apparatus 100 is removed.

The login processing unit 112 requests the screen control unit 123 of the image processing service 12 to display the home screen W1 (step S209). In response, the screen control unit 123 displays the home screen W1 (step S210).

Then, the screen control unit 123 sends the result of displaying the home screen W1 to the login processing unit 112 of the extension application 11 requesting to display the screen (step S211).

Thus, in the image processing apparatus 100 of this embodiment, access control is set again on an image processing function (i.e., access control on the image processing function is restored) when the user logs out. Also when the user logs out, the login information of the user is removed from the memory and the image processing apparatus 100 stops recording the usage history of the image processing function associated with the user.

<Process Performed when Guest User Logs in>

FIG. 9 is a sequence chart illustrating an exemplary process performed when a guest user logs in. In FIG. 9, it is assumed that the copy button B2 on the home screen W1 of FIG. 5 is pressed, and the initial function screen (copy screen) W3 is then displayed.

As illustrated in FIG. 9, when the copy button B2 is pressed on the home screen W1, the UI request determining unit 111 of the extension application 11 receives an operation event including a button ID (operation button identifier) of the copy button B2 (step S301).

Based on the button ID in the operation event, the UI request determining unit 111 determines the type of the operation button (the copy button B2) pressed, and determines that a request for a guest login process is received (step S302). Then, based on the determination result, the UI request determining unit 111 requests the guest login processing unit 114 to perform a guest login process (step S303).

The guest login processing unit 114 accesses the guest user information storing unit 115 based on the requested function (the copy function) and thereby obtains the guest user information 115D including a user ID (guest user identifier) of the guest user and a function ID of the copy function (access right information) that the guest user is allowed to use (step S304). More specifically, the guest login processing unit 114 determines the requested function (the copy function), which is requested by the guest user by pressing the copy button B2, based on the operation event received by the UI request determining unit 111. Then, the guest login processing unit 114 accesses the guest user information storing unit 115, and obtains access right information (function ID) corresponding to the requested function (the copy function) and the user identifier (user ID) associated with the access right information as the guest user information 115D.

Next, the guest login processing unit 114 generates guest login information including the user ID of the guest user based on the guest user information 115D obtained from the guest user information storing unit 115 (step S305). Also, based on the guest user information 115D, the guest login processing unit 114 sets the function ID of the copy function (access right information) in the generated login information (step S306). As a result of the above steps, the guest login information is stored and retained in the memory of the image processing apparatus 100.

The guest login processing unit 114 sends the generated guest login information to the login/logout control unit 121 of the image processing service 12 to request the login/logout control unit 121 to perform a login process (step S307). In this step, the guest login processing unit 114 sets the login/logout control unit 121 to a guest login mode. The login/logout control unit 121 performs a login process for the guest user based on the guest login information received from the guest login processing unit 114 (step S308).

The login/logout control unit 121 sends the access right information in the guest login information to the access control unit 122 to request the access control unit 122 to perform an access control process (step S309).

The access control unit 122 identifies an image processing function based on the access right information (the function ID of the copy function) received from the login/logout control unit 121 and disables access control on the identified image processing function (the copy function) (step S310). Then, the access control unit 122 reports the result of disabling access control to the login/logout control unit 121.

The login/logout control unit 121 sends the result of the login process to the guest login processing unit 114 of the extension application 11 requesting the login process (step S311).

The guest login processing unit 114 obtains the function ID of the copy function, which is the initial function for the guest user, from the guest login information (step S312). The guest login processing unit 114 sends the obtained function ID to the screen control unit 123 of the image processing service 12 to request the screen control unit 123 to display an operation screen for the copy function (step S313). The screen control unit 123 displays the operation screen (initial function screen) for the copy function based on the function ID received from the guest login processing unit 114 (step S314).

Then, the screen control unit 123 sends the result of displaying the initial function screen (copy screen) to the guest login processing unit 114 of the extension application 11 requesting to display the screen (step S315).

Thus, in the image processing apparatus 100 of this embodiment, access control on an image processing function (access-allowed function) is disabled based on access right information in guest login information of the guest user and the image processing function is executed. Also in the image processing apparatus 100, the guest user using the image processing function is identified based on the user identifier in the guest login information and a usage history of the image processing function is recorded in association with the guest user (or the user identifier). For this purpose, the image processing apparatus 100 may include a usage history recording unit that records usage history of an image processing function in association with the guest user based on a user identifier in guest login information.

Meanwhile, when a result indicating failure of the login process is received from the login/logout control unit 121 of the image processing service 12, the guest login processing unit 114 requests the screen control unit 123 of the image processing service 12 to display a login result screen for reporting that the login process has failed. In response, the screen control unit 123 displays the login result screen.

<Process Performed when Guest User Logs out>

FIG. 10 is a sequence chart illustrating an exemplary process performed when a guest user logs out. In FIG. 10, it is assumed that the home button B32 on the initial function screen W3 of FIG. 5 is pressed, the home screen W1 is displayed, and thereafter the login button B1 on the home screen W1 is pressed. Below, steps in FIG. 10 that are different from the steps in FIG. 7 are mainly described.

As illustrated in FIG. 10, when the login button B1 is pressed on the home screen W1, the UI request determining unit 111 of the extension application 11 receives an operation event including authentication information such as a user ID and a password entered on the login screen W2 (step S101).

Since the operation event includes the authentication information, the UI request determining unit 111 determines that a request for a normal login process is received (step S102). Then, based on the determination result, the UI request determining unit 111 requests the login processing unit 112 to perform a normal login process (step S103).

The login processing unit 112 determines whether the guest user is still logged in (step S401). More specifically, the login processing unit 112 determines whether guest login information is retained in the memory and thereby determines whether the guest user is still logged in.

If the guest login information is retained in the memory (i.e., if the guest user is still logged in), the login processing unit 112 requests the login/logout control unit 121 of the image processing service 12 to perform a logout process (step S402). In this step, the login processing unit 112 sets the login/logout control unit 121 to a guest logout mode. The login/logout control unit 121 performs a logout process for the guest user in response to the request from the login processing unit 112 (step S403). More specifically, the login/logout control unit 121 determines whether a requested job requested by the guest user has been completed and thereby determines whether it is appropriate to perform the logout process for the guest user.

If the requested job has been completed (i.e., if it is appropriate to perform the logout process for the guest user), the login/logout control unit 121 requests the access control unit 122 to perform an access control process to set access control on the image processing function (the access-allowed function of the guest user), i.e., to restore access control on the image processing function (step S404).

In response to the request from the login/logout control unit 121, the access control unit 122 sets access control on the image processing function (step S405). Then, the access control unit 122 reports the result of setting access control to the login/logout control unit 121 requesting the access control process. The login/logout control unit 121 sends the result of the logout process to the login processing unit 112 of the extension application 11 requesting the logout process (step S406). As a result, the guest login information is removed from the memory.

The login processing unit 112 obtains the authentication information from the UI request determining unit 111 (step S104), sends the obtained authentication information to the external authentication processing unit 113, and thereby requests the external authentication processing unit 113 to request the authentication/access management service 21 to perform user authentication (step S105).

The external authentication processing unit 113 sends the authentication information to the authentication unit 211 of the authentication/access management service 21 to request user authentication (step S106). The authentication unit 211 performs user authentication by accessing the user information DB 31 based on the authentication information received from the external authentication processing unit 113.

When the user is an authorized user (i.e., when the user is successfully authenticated), the authentication unit 211 obtains user information of the user (authorized user) from the user information DB 31 (step S107). Next, the authentication unit 211 sends an authentication result including the obtained user information to the external authentication processing unit 113 of the extension application 11 (step S108). Thus, the external authentication processing unit 113 receives the user information from the authentication unit 211. The user information may include a user ID (user identifier), a function ID(s) indicating an access-allowed function(s) (access right information), and a function ID of an initial function (initial function information).

The external authentication processing unit 113 sends the received user information to the login processing unit 112 that has requested the user authentication and thereby reports that the authentication result has been received.

Thus, when receiving a login request from an authentication-requesting user while the guest user is still logged in, the image processing apparatus 100 performs a logout process for the guest user and sets access control on the image processing function again. Also in the logout process, the image processing apparatus 100 removes the guest login information of the guest user from the memory and stops recording the usage history of the image processing function associated with the guest user.

Meanwhile, if the requested job has not been completed (i.e., if it is not appropriate to perform the logout process for the guest user), the login/logout control unit 121 does not request the access control unit 122 to perform an access control process to set access control on the image processing function. In this case, the login/logout control unit 121 sends a logout result indicating that the logout process has failed to the login processing unit 112 of the extension application 11. The login processing unit 112 requests the screen control unit 123 of the image processing service 12 to display a logout result screen for reporting that the logout process has failed. In response, the screen control unit 123 displays the logout result screen.

<Summary>

In the image processing apparatus 100 of the above embodiment, the UI request determining unit 111 of the extension application 11 determines whether a received request to access an image processing function is from the guest user. When it is determined by the UI request determining unit 111 that the request is from the guest user, the guest login processing unit 114 performs a login process for the guest user. In the login process for the guest user, the guest login processing unit 114 generates guest login information including a user identifier and access right information (indicating a right to access a given image processing function(s)) of the guest user based on predefined guest user information 115D, and sends the generated guest login information to the login/logout control unit 121 of the image processing service 12 to request to perform a login process for the guest user. The login/logout control unit 121 requests the access control unit 122 to disable access control on the image processing function based on access right information in the guest login information. Then, the image processing function is executed. Also in the image processing apparatus 100, a usage history of the image processing function is recorded in association with the guest user (or the user identifier) based on the user identifier in the guest login information.

Thus, the image processing apparatus 100 of the above embodiment automatically generates guest login information including a user identifier and access right information of the guest user and controls access to image processing functions based on the generated guest login information. This configuration eliminates the need for the guest user to enter authentication information to use an image processing function, thereby enabling the guest user to use an image processing function with a simple operation, and also makes it possible to record a usage history of the guest user.

In the access control system 1 where authentication of users of the image processing apparatus 100 is performed through collaboration between the image processing apparatus 100 and the authentication management apparatus 200 connected to each other via the data communication channel N, user authentication cannot be performed if a communication problem occurs between the image processing apparatus 100 and the authentication management apparatus 200. Even in such a case, the image processing apparatus 100 of the above embodiment enables a user to use a frequently-used image processing function as a guest user, and also makes it possible to record a usage history.

The access control function of the above embodiment may be implemented, for example, by executing a program(s), which is written in a programming language supported by the operating environment (platform) of the image processing apparatus 100, using a processing unit (i.e., the CPU 1101) of the image processing apparatus 100.

The program may be stored in a non-transitory computer-readable storage medium (e.g., the storage medium 1104a) such as a CD, a DVD, an SD card, or a USB memory. For example, the program stored in the storage medium 1104a may be installed in the image processing apparatus 100 via the external storage I/F 1104. Alternatively, the program may be downloaded and installed via a telecommunication line and the network I/F 1103 into the image processing apparatus 100.

<Variation>

In the above embodiment, the image processing apparatus 100 collaborates with the authentication management apparatus 200 including the authentication/access management service 21 and the user information DB 31 stored in an external storage unit. However, the present invention may also be applied to systems with different configurations. For example, the image processing apparatus 100 may include software for implementing the authentication/access management service and may be configured to collaborate with the user information DB 31. As another example, the image processing apparatus 100 may include software for implementing the authentication/access management service 21 as well as the user information DB 31. That is, the image processing apparatus 100 may also include the user authentication function.

In the above embodiment, the copy button B2 is provided as an example of an operation button for the guest user. An operation button for the guest user is a GUI provided on the home screen W1 to allow the guest user to use an image processing function with a simple operation. Therefore, an operation button for any frequently-used image processing function other than the copy function may also be provided for the guest user. For example, in addition to the copy button B2, a scan button for the scan function may be provided on the home screen W1 as another operation button for the guest user.

Although only the access rights to the copy function is assigned to the guest user in the example of FIG. 6, access rights to multiple image processing functions may be assigned to the guest user. Also, the guest user information 115D may include multiple combinations of guest user identifiers and access rights to image processing functions.

In the above embodiment, when the guest user presses the home button B32 on the initial function screen W3 after the login process, the operation screen returns to the home screen W1. However, the present invention is not limited to the above described embodiment. For example, the image processing apparatus 100 may be configured such that the initial function screen W3 is automatically switched to the home screen W1 if no operation event is received for a predetermined period of time (or if a screen switch condition is satisfied). In this case, the guest login processing unit 114 may be configured to determine whether the screen switch condition is satisfied and to request the screen control unit 123 of the image processing service 12 to display the home screen W1 if the screen switch condition is satisfied.

The present invention is not limited to the specifically disclosed embodiments, and variations and modifications may be made without departing from the scope of the present invention.

An aspect of this disclosure provides an image processing apparatus, an access control method, and a non-transitory computer-readable storage medium storing program code that make it possible for a guest user to use an image processing function with a simple operation and also make it possible to record a usage history of the image processing function in association with the guest user.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An image processing apparatus, comprising:
a user interface display panel configured to receive an operation event indicating a request to use an image processing function;
a memory configured to store a program; and
one or more processors configured to execute the program, wherein the program which, when executed by the one or more processors, functions as:
a request determining unit configured to determine whether the request is from a guest user based on the received operation event;
a guest login processing unit configured to generate guest login information including a guest user identifier and access right information of the guest user when the request is from the guest user and to send a login request to request a login process for the guest user based on the guest login information;

an access control unit configured to disable access control on the image processing function in response to the login request based on the access right information in the guest login information;

a usage history recording unit configured to record a usage history of the image processing function in association with the guest user based on the guest user identifier in the guest login information; and a login processing unit configured to
determine whether the guest login information has been generated by the guest login processing unit, and
request a login/logout control unit to perform a logout process for the guest user before requesting to perform a login process for a user when the guest login information has been generated, wherein the login/logout control unit is configured to
determine whether a job requested by the guest user has been completed when the request to perform the logout process for the guest user is received from the login processing unit, and
request the access control unit to set the access control on the image processing function when the job has been completed;

wherein the access control unit is configured to set the access control on the image processing function when requested by the login/logout control unit; and wherein the login/logout control unit is configured to send a result of the logout process to the login processing unit based on a result of setting the access control on the image processing function by the access control unit.

2. The image processing apparatus as claimed in claim 1, wherein the request determining unit is configured to
determine whether the operation event includes authentication information, and
determine that the request is from the guest user when the operation event does not include the authentication information.

3. The image processing apparatus as claimed in claim 1, wherein the memory is configured to store guest user information including the guest user identifier and the access right information associated with the guest user identifier, and
wherein the guest login processing unit is configured to obtain the guest user information from the memory and to generate the guest login information based on the obtained guest user information.

4. The image processing apparatus as claimed in claim 3, wherein the guest login processing unit is configured to
identify the image processing function requested by the guest user based on an operation button identifier included in the operation event,
obtain the access right information where the identified image processing function is specified and the guest user identifier associated with the access right information from the memory, and
set the obtained access right information and guest user identifier in the guest login information.

5. The image processing apparatus as claimed in claim 1, wherein the login/logout control unit is configured to
request the access control unit to disable the access control on the image processing function when the login request for the guest user is received from the guest login processing unit, wherein the access control unit is configured to identify the image processing function based on the access right information in the guest login information and to disable the access control on the identified image processing function when requested by the login/logout control unit, and wherein the login/logout control unit is configured to send a result of the login process to the guest login processing unit based on a result of disabling the access control on the image processing function by the access control unit.

6. The image processing apparatus as claimed in claim 5, wherein the login processing unit is configured to
perform user authentication based on authentication information entered by the user when the request determining unit determines that the request is not from the guest user,
generate login information including a user identifier and access right information of the user based on user information obtained as a result of the user authentication, and
request the login/logout control unit to perform the login process for the user based on the login information.

7. A method performed by an image processing apparatus, the method comprising:
receiving an operation event indicating a request to use an image processing function;
determining, with one or more processors, whether the request is from a guest user based on the received operation event;
generating, with the one or more processors, guest login information including a guest user identifier and access right information of the guest user when the request is from the guest user;
requesting, with the one or more processors, a login process for the guest user based on the guest login information;
disabling, with the one or more processors, access control on the image processing function in response to the request for the login process based on the access right information in the guest login information;
recording, with the one or more processors, a usage history of the image processing function in association with the guest user based on the guest user identifier in the guest login information,
wherein whether guest login information has been generated is determined and when the guest login information has been generated, a logout process for the guest user is performed before the login process for a user;
determining, with the one or more processors, whether a job requested by the guest user has been completed when the logout process for the guest user is requested;
setting, with the one or more processors, the access control on the image processing function when the job has been completed; and
reporting, with the one or more processors, a result of the logout process based on a result of setting the access control on the image processing function.

8. The method as claimed in claim 7, further comprising:
determining, with the one or more processors, whether the operation event includes authentication information,
wherein when the operation event does not include the authentication information, it is determined that the request is from the guest user.

9. The method as claimed in claim 7, further comprising:
obtaining, with the one or more processors, guest user information including the guest user identifier and the access right information associated with the guest user identifier from a memory of the image processing apparatus,
wherein the guest login information is generated based on the obtained guest user information.

10. The method as claimed in claim 9, further comprising:
identifying, with the one or more processors, the image processing function requested by the guest user based on an operation button identifier included in the operation event;
obtaining, with the one or more processors, the access right information where the identified image processing function is specified and the guest user identifier associated with the access right information from the memory; and
setting, with the one or more processors, the obtained access right information and guest user identifier in the guest login information.

11. The method as claimed in claim 7, further comprising:
identifying, with the one or more processors, the image processing function the access control on which is to be disabled based on the access right information in the guest login information; and
reporting, with the one or more processors, a result of the login process based on a result of disabling the access control on the image processing function.

12. The method as claimed in claim 11, further comprising:
performing, with the one or more processors, user authentication based on authentication information when the request is not from the guest user;
generating, with the one or more processors, login information including a user identifier and access right information of the user based on user information obtained as a result of the user authentication; and
performing, with the one or more processors, the login process for the user based on the login information.

13. A non-transitory computer-readable storage medium having stored thereon a computer program having computer-readable program code that when executed by one or more processors of an image processing apparatus, causes the image processing apparatus to perform a method comprising:
receiving an operation event indicating a request to use an image processing function;
determining whether the request is from a guest user based on the received operation event;
generating guest login information including a guest user identifier and access right information of the guest user when the request is from the guest user;
requesting a login process for the guest user based on the guest login information;
disabling access control on the image processing function in response to the request for the login process based on the access right information in the guest login information;
recording a usage history of the image processing function in association with the guest user based on the guest user identifier in the guest login information,
wherein whether guest login information has been generated is determined and when the guest login information has been generated, a logout process for the guest user is performed before the login process for a user;
determining whether a job requested by the guest user has been completed when the logout process for the guest user is requested;
setting the access control on the image processing function when the job has been completed; and
reporting a result of the logout process based on a result of setting the access control on the image processing function.

* * * * *